United States Patent [19]

Erich, Jr.

[11] 4,143,737
[45] Mar. 13, 1979

[54] ROTATING ECCENTRIC WEIGHT SEISMIC SOURCES AND A SEISMIC EXPLORATION METHOD

[75] Inventor: Otis G. Erich, Jr., Brea, Calif.
[73] Assignee: Union Oil Company of California, Brea, Calif.
[21] Appl. No.: 765,799
[22] Filed: Feb. 4, 1977
[51] Int. Cl.$^2$ .......................... G01V 1/14; G01V 1/04
[52] U.S. Cl. ..................... 181/121; 340/15.5 TA; 73/574; 73/667; 74/61
[58] Field of Search ............... 340/15.5 TA, 15.5 TC, 340/17; 181/111, 113, 114, 121, 139; 175/1; 73/574, 667; 74/61

[56] References Cited

U.S. PATENT DOCUMENTS

| 3,185,250 | 5/1965 | Glazier | 181/121 |
|---|---|---|---|
| 3,244,252 | 4/1966 | Burns | 181/121 |
| 3,326,320 | 6/1967 | Forester | 340/15.5 TA |
| 3,416,632 | 12/1968 | Bodine | 181/121 |
| 3,583,521 | 6/1971 | Anstey | 340/15.5 TA |
| 3,608,359 | 9/1971 | Christmann | 73/667 |
| 3,697,938 | 10/1972 | Taner | 340/15.5 TA |
| 3,878,733 | 4/1975 | Tertinek | 74/61 |
| 4,011,924 | 3/1977 | Barbier | 181/114 |

FOREIGN PATENT DOCUMENTS

358242  1/1938  Italy ......................... 181/121

Primary Examiner—Nelson Moskowitz
Attorney, Agent, or Firm—Richard C. Hartman; Dean Sandford; Daniel R. Farrell

[57] ABSTRACT

Compact, lightweight, rotating eccentric weight seismic sources and a seismic exploration method particularly suitable for use in relatively inaccessible onshore regions. The source includes an eccentric weight rotatable about an axis and a sensor to detect the instant of peak earthward force developed by the source. A coded energy signal is transmitted into the earth and the seismic waves returned from within the earth are detected. The polarity of a signal proportional to the seismic waves is periodically sampled to produce a plurality of sign-bit samples. The sign-bit samples are automatically shift-summed in response to a code signal generated by the sensor, thereby forming a plurality of shift-summed samples which are recorded to provide a correlated seismic trace.

24 Claims, 13 Drawing Figures

ROTATING ECCENTRIC WEIGHT SEISMIC SOURCES AND A SEISMIC EXPLORATION METHOD

BACKGROUND OF THE INVENTION

1. Field of the Invention

This invention relates to the art of geophysical exploration using artificial seismic energy, and more particularly, to apparati and methods for seismic exploration of onshore regions that are relatively inaccessible to vehicles.

2. Description of the Prior Art

Geophysical prospecting using aritificially induced seismic disturbances has found wide application in the search for petroleum and other valuable resources. It is the general practice to generate energy at a source point near the surface of the earth and to direct seismic energy into the earth from that point. The energy returning from within the earth is sensed and recorded. The seismic trace thus recorded is processed and then interpreted to provide an indication of the structure of the underlying strata.

In the exploration of regions which are relatively inaccessible to vehicles, the weight of supplies and equipment required determines the practicality of a particular exploration system. At the present time, a wide variety of low energy seismic exploration systems are available. In these systems, a coded energy signal is transmitted into the earth and the raw seismic data which is obtained is correlated according to the code of the coded energy signal. The record, or signature, of the source code must be of very good quality in order to obtain a good quality correlated trace. The low energy systems can be generally classified according to the method employed to obtain the source signature as either a master-type or a slave-type source system. In the master-type source systems, the source signature is sensed as the coded energy signal is transmitted. In the slave-type source systems, the source signature is predetermined and a slave source is commanded to transmit that signature.

In the master-type source system disclosed in French Pat. No. 2,247,734 the source emissions are controlled manually within the physical limits of the powered impactor source. Powered impactor sources are difficult to control in a manner which will produce a good source code because they tend to operate at certain natural frequencies and are subject to undesirable residual bounces. Master-type source systems employing rotating eccentric weight sources are disclosed in U.S. Pat. No. 3,185,250 to Glazier, U.S. Pat. No. 3,244,252 to Burns, and U.S. Pat. No. 2,921,477 to Hanggi. In all the prior art master-type source systems, the source signature is monitored by a sensor, such as an accelerometer or geophone, which is located on or near the source. While these master-type source systems of the prior art are relatively light-weight and would therefore be well suited to exploration in regions not accessible to vehicles, they have not been used successfully because the source signatures obtained by the prior art sensors are attenuated and phase shifted and usually contain significant interferences. Cross-correlation of the seismic trace with this poor quality source signature yields poorly resolved processed traces. Consequently, numerous methods have been devised to extract the true source code from the source signature. However, these methods have only been moderately successful.

On the other hand, the processed traces obtained by use of the slave-type source systems have much better resolution. Because the source transmits energy according to a predetermined code, the code is known and need not be recorded by use of a sensor. Furthermore, carefully designed source codes, which yield high resolution seismic data, can be transmitted by precise control of the source. The slave-type source systems, such as the well known VIBROSEIS ® system developed and licensed by Continental Oil Company, Pona City, Oklahoma, have been relatively successful. However, the weight of the equipment required, specifically the heavy master control and vibratory employed, increases markedly as the resolving power of these systems is enhanced. Since the VIBROSEIS ® and similar type sources must be coupled to the ground, their peak force to weight ratio must be less than 1. The best of these sources are normally vehicle mounted and weigh between about 10 and about 20 tons. Due to this great weight, slave-type source systems are impractical for use in regions not accessible to vehicles.

Due to the various inadequacies and limitations of these prior art low energy, multiple emission systems, exploration in regions not accessible to vehicles is currently performed with the more primitive single-shot explosive systems. These systems are preferred even though they require seismic and drilling crews of typically between 100 and 500 men to carry the equipment and supplies. In many regions, these explosive systems are prohibited due to their adverse impact on the environment. Clearly a need exists for a light weight, high resolution seismic exploration system for use in regions not accessible to vehicles.

Accordingly, a primary object of this invention is to provide a lightweight and high resolution seismic exploration system.

Another object of this invention is to provide a seismic source which includes means for sensing the time breaks of the source impulses.

A further object of this invention is to provide a master-type seismic source which includes a sensor for providing an accurate and noise-free source signature.

Yet another object of this invention is to provide a seismic exploration method in which the required weight of the exploration equipment is reduced without sacrificing seismic data quality.

Another object of this invention is to provide a seismic exploration system for use in relatively inaccessible onshore applications in which the source means and the data handling method employed cooperate to reduce the overall weight requirement of the system.

Other objects and advantages of this invention will become apparent to those skilled in the art from the following description.

SUMMARY OF THE INVENTION

The seismic source devices of this invention include a rotatable element mounted for rotation about an axis of rotation displaced from the center of mass of the element. This rotatable eccentric is rotatably driven about this axis by means of a prime mover mounted on the device. The devices also include a sensor for detecting the instant during each revolution of the eccentric at which the center of mass of the rotatable element passes the point about the axis of rotation at which the peak earthward force is developed and for generating a code signal indicative of the time break of each occurrence of the peak earthward force.

One specific embodiment of the seismic source device of this invention includes a pair of rotatable eccentrics coaxially mounted for rotation about the same axis of rotation. The eccentrics are counter-rotated at the same speed.

Another embodiment of the seismic source device of this invention includes a first pair of rotatable eccentrics coaxially mounted for rotation about a first axis and a second pair of rotatable eccentrics coaxially mounted for rotation about a second axis parallel to and displaced from said first axis. Each pair of eccentrics are counter-rotated about their respective axes at the same speed. The device can also include means for shifting the phase relationship between the eccentrics of each pair to vary the magnitude of the peak earthward force developed.

In the seismic exploration method of this invention a rotating eccentric weight seismic source is placed on the earth surface. The eccentric weight(s) are rotated at varying speeds, thereby generating an energy signal with a frequency-variable code. The source decouples from the earth surface, striking the surface once during each revolution of the rotating weights, thereby transmitting a coded plurality of impulses into the earth. The sensor senses the instants of peak earthward force for each revolution of the eccentric weight(s) i.e., the instant which corresponds to the instant of impact of the device with the earth surface, and generates a code signal containing the time break of each source impulse. The seismic energy returned from within the earth is sensed and its plurality is periodically sampled. The sign-bit samples thus obtained are automatically shift-summed in response to the code signal and the shift-summed samples are recorded, thereby effecting correlation of the seismic data in real time.

BRIEF DESCRIPTION OF THE DRAWINGS

The invention will be more readily understood by reference to the accompanying drawings, in which.

DETAILED DESCRIPTION OF THE INVENTION

The novel seismic sources of this invention are provided with one or more eccentric weights which are caused to rotate about an axis of rotation. The weights may rotate in unison or may be counter-rotating, although counter-rotation is preferred. A prime mover causes the weights to rotate about the axis of rotation at either increasing or, alternatively, decreasing speeds, thereby generating an energy signal with a frequency varying code. If the source is coupled to the earth, the coded energy signal transmitted into the earth will be a sinusoidal function. Preferably, in the method of this invention, the source is not coupled to the earth and a multiple impulse coded energy signal is developed by a plurality of impacts of the source against the earth surface.

As used herein, the term "coupled to the earth" means that the source is held in continuous contact with the earth surface, usually by hold down weight or anchors. In contrast, decoupling sources bounce, that is, their contact with the earth surface is discontinuous during the period of the seismic energy transmission.

In either mode of operation, a sensor mounted on the source senses the exact instant at which the center of mass of the rotating weight passes a particular angular position about the axis of rotation, which position corresponds to the point at which the peak earthward force is developed by the source.

The decoupling sources of this invention strike the earth surface once during each revolution of the eccentric weight(s), the instant of impact coinciding with the instant at which the peak earthward force is developed. The sensor generates a code signal which contains the time break of each occurrence of the peak earthward force and therefore the time break of the source impulses.

The sensors useful in this invention include magnetic, optical and electrical devices which are well known in the sensing art. The sensor is comprised of (1) an actuator and (2) a pulse generator which generates a pulse at each instant that the actuator passes in close proximity to it. The actuator and pulse generator are mounted so that they are in close proximity at, and preferably only at, the instant of peak earthward force of the source, for each revolution of the rotatable weights. One of these elements, normally the actuator, is mounted so that it rotates with the rotating eccentric weight and the other, normally the pulse generator, is stationary. The rotating element can be mounted on one of the rotating weights or, for example, on a wheel, gear, or arm which is rotatable with the eccentric weight.

Sensors suitable for use in this invention are those which emit a pulse or small wavelet in response to a desired stimulus, but which are relatively insensitive to background interferences including vibrations, sounds, radio signals and ground noises. Suitable sensors include: optic sensors, comprising a light source actuator and a photocell pulse generator; electrical sensors, comprising for example a metal contact actuator which completes the otherwise open circuit of the electrical pulse generator, thereby allowing a current to flow; and magnetic sensors, comprising a metal protrusion, or preferably, a magnet actuator and a pulse generator comprising an electric wire coiled around either a magnet or a metal pole piece in a magnetic field, in which coil an electric current is induced by the movement of the actuator past the pulse generator. Magnetic sensors are preferred because they are more durable and require less maintenance. A wide variety of suitable magnetic sensors are available from the Electro Corporation of Sarasota, Florida, and others.

The forces developed by rotation of eccentric weights about an axis of rotation act, in general, perpendicular to the axis of rotation. Although the axis of rotation of the sources of this invention can be arranged in any plane, it is preferred that the source be arranged so that the axis of rotation is perpendicular to the desired plane of force. Accordingly, for vertical exploration of earth strata underlying a horizontal surface, it is preferred that the axis of rotation is substantially horizontal, i.e., parallel to the surface of the earth.

The instant of peak earthward force of the source is the instant at which the earthward component of the vector sum of the rotating eccentric weight(s) momentum vector(s) is at a maximum away from the earth. The peak earthward force occurs once per revolution of the eccentric weight(s) and its magnitude can vary depending on the rotational speed and eccentric moment(s) of the rotating weight(s). For a given orientation of the rotating eccentric weight source, the position of the eccentric weight(s) at the instant of peak earthward force for each revolution will always be the same. Accordingly, the actuator and the pulse generator should be positioned so that the rotating element passes the stationary element as the center of mass of the eccentric weight(s) passes the point corresponding to the angular position at which the peak earthward force is developed. For a single eccentric weight rotating about an axis parallel to the horizontal earth surface, the peak earthward force is developed when the center of mass is rising and is at the same height as its axis of rotation, corresponding to its highest velocity away from the earth.

Figure 3:
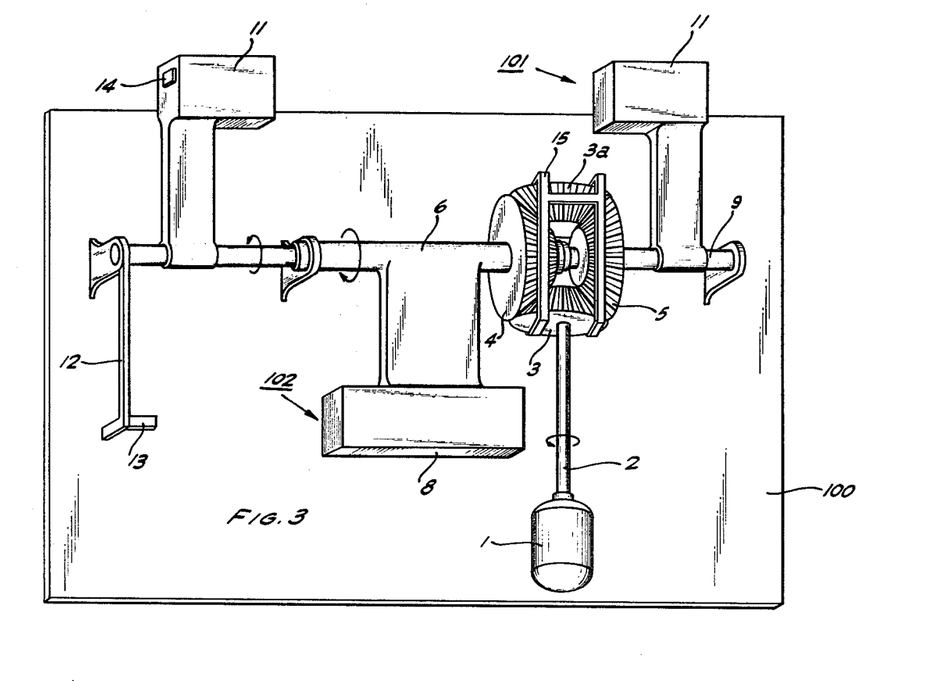
FIG. 3 is a top view of one embodiment of the counter-rotating eccentric weight seismic source of this invention.

For a set of balanced co-axial counter-rotating eccentric weights, such as illustrated in FIG. 3, the net force generated by the rotating weights acts in only one plane, since the components of their momentum vectors which are perpendicular to that plane cancel each other. The instant of peak force occurs twice during each revolution when the centers of mass of the weights are 180° apart. The direction of the peak force is opposite to the direction of travel of the rotatable elements in the 180° opposed position, thus the peak force occurs twice per revolution, but in opposite directions. The plane of the produced force passes through the axis of rotation and is perpendicular to a line connecting the centers of mass of the eccentric weights in that position. The position of the weights at the instant of peak earthward force depends on the angle of this force plane with respect to the earth.

As used herein, master-type source systems include all seismic exploration systems in which the seismic data received is correlated with a source signature obtained by sensing or monitoring the actual seismic source transmissions, as opposed to slave-type source systems in which the seismic data received is correlated with a predetermined source code. The preferred sources for exploration of relatively inaccessible regions are manually controlled sources, although sources which generate energy in response to a master controller, such as a programmed minicomputer, can be used.

Figure 2:
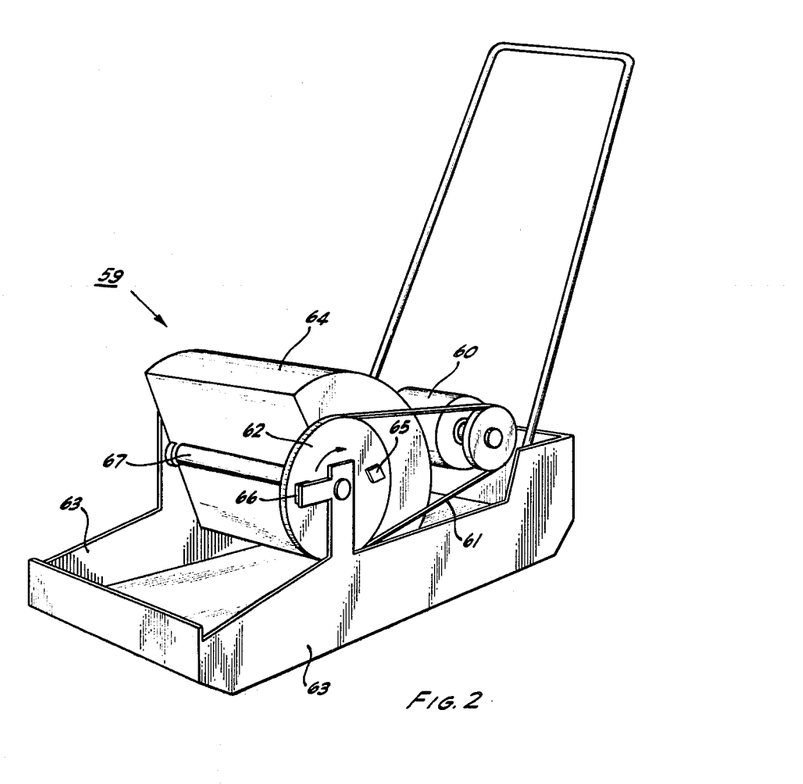
FIG. 2 is a perspective view of one embodiment of the rotating eccentric weight seismic source of this invention.

FIG. 2 illustrates one embodiment of the rotating eccentric weight seismic source of this invention employing a single rotatable element. In this embodiment, rotatable element 59 includes eccentric weight 64, having a center of mass displaced from the axis of rotation and pulley 62, both of which are fixedly attached to axle 67. Axle 67 is rotatably mounted on base 63 by means of bearings, not shown, and is supported above and parallel to the lower surface of base 63. Rotatable element 59 is rotatable about an axis coincident with the center line of axle 67, i.e., the axis of rotation is parallel to and above the lower surface of base 63. Prime mover 60 is mounted on base 63 and drives rotatable element 59 by drive belt 61 which engages pulley 62.

Actuator 65 is attached to pulley 62 so as to rotate with rotatable element 59 and is located at a point above axle 67 coinciding with radius that passes through the center of mass of rotatable element 59. Pulse generator 66 is fixedly mounted on base 63 and is located in a position such that actuator 65 passes it once during each revolution of rotatable element 59 at the point corresponding to the angular position of the center of mass of element 59 at which the peak earthward force is developed, i.e., in this embodiment at the point at which the center of mass is traveling perpendicular to and away from the lower surface of base 63.

In operation, prime mover 60 drives rotatable element 59 clockwise by means of drive belt 61. When eccentric weight 64 has been rotated clockwise from the illustrated position until the flat face of weight 64 is perpendicular to the lower surface of base 63 and facing prime mover 60, the center of mass of rotatable element 59 will be traveling perpendicular to and away from the lower surface of base 63 and actuator 65 will be aligned with and in close proximity to pulse generator 66. This is the position of the rotatable element at the instant of peak earthward force, and occurs once during each revolution of element 59. The force magnitude generated will increase as the rotational speed is increased and will decrease as the rotational speed is decreased.

The exact angular and radial positions of actuator 65 and pulse generator 66 about the axis of rotation are not critical as long as they become aligned and pass in close proximity at the instant of peak earthward force for each revolution of rotatable element 59.

Conventional vibrating plate compactors which are employed to compact soils and asphalt are similar in design to the apparatus illustrated in FIG. 2. These compactors, such as those marketed by the Wacker Corporation of Milwaukee, Wisconsin, can be modified by the addition of a sensor of the type hereinabove described to produce one embodiment of the rotating eccentric weight seismic source of this invention. However, for use in non-vehicular regions, a lighter weight seismic source of the basic design illustrated in FIG. 2 can be constructed by more careful selection of the construction materials as discussed more fully hereinafter.

FIG. 3 illustrates another embodiment of a rotating eccentric weight seismic source of this invention employing coaxial counter-rotating eccentric weights. In this embodiment, rotatable element 101 includes eccentric weights 11 having centers of mass displaced from the axis of rotation and gear 5, both of which are fixedly attached to axle 9; and rotatable element 102 includes eccentric weight 8 having a center of mass displaced from the axis of rotation and gear 4, both of which are fixedly attached to axle 6, which is concentric with axle 9. Axles 6 and 9 are rotatably mounted on base 100 by means of bearings, not shown, and are supported above and parallel to the lower surface of base 100. Rotatable elements 101 and 102 are counter-rotatable about an axis coincident with the center line of concentric axles 6 and 9, i.e., the axis of rotation is parallel to and above the lower surface of base 100. Prime mover 1 is mounted on base 100 and counter-rotates rotatable elements 101 and 102 by means of shaft 2 and conversion gears 3 and 3a. Conversion gears 3 and 3a are secured by frame 15 and are preferably enclosed by a gear housing, not shown.

Actuator 14 is attached to eccentric weight 11 so as to rotate with rotatable element 101 and is located at a point about axel 9 coinciding with a radius that passes through the center of mass of rotatable element 101. Pulse generator 13 is fixedly mounted on base 100 by brace 12 and is located in a position such that actuator 14 passes it once during each revolution of rotatable element 101 at the point corresponding to the angular position of actuator 14 at which the peak earthward force is developed. This angular position depends on the relative orientation of elements 101 and 102.

In the preferred embodiment, the eccentric moments of elements 101 and 102 about the axis of rotation are equal and elements 101 and 102 are oriented such that the rotating centers of mass are 180° apart about the axis of rotation when they are traveling perpendicular to and away from the lower surface of base 100. By employing rotatable elements with equal eccentric moments, the force generated by the source will act in only one plane, which plane passes through the axis of rotation and is perpendicular to a line connecting the rotatable element centers of mass when they are 180° apart. Preferably rotatable elements 101 and 102 are oriented such that the plane of force is perpendicular to the earth surface.

In operation, prime mover 1 rotates gear 3 via shaft 2, thereby rotating rotatable element 102 in a clockwise direction, and rotatable element 101 in a counter-clockwise direction. With base 100 placed on a horizontal earth surface, the instant of peak earthward force occurs when counter-rotating elements 101 and 102 are disposed 180° apart, and the center of mass of each element is traveling perpendicular to and away from the lower surface of base 100. When elements 101 and 102 are at this position, actuator 14 will be aligned with and in close proximity to pulse generator 13.

It is preferred that elements 101 and 102 rotate at the same speed. As the rotational speed is increased, the magnitude of the peak force generated will increase and as the rotational speed is decreased, the magnitude of the force will decrease.

Figure 4:
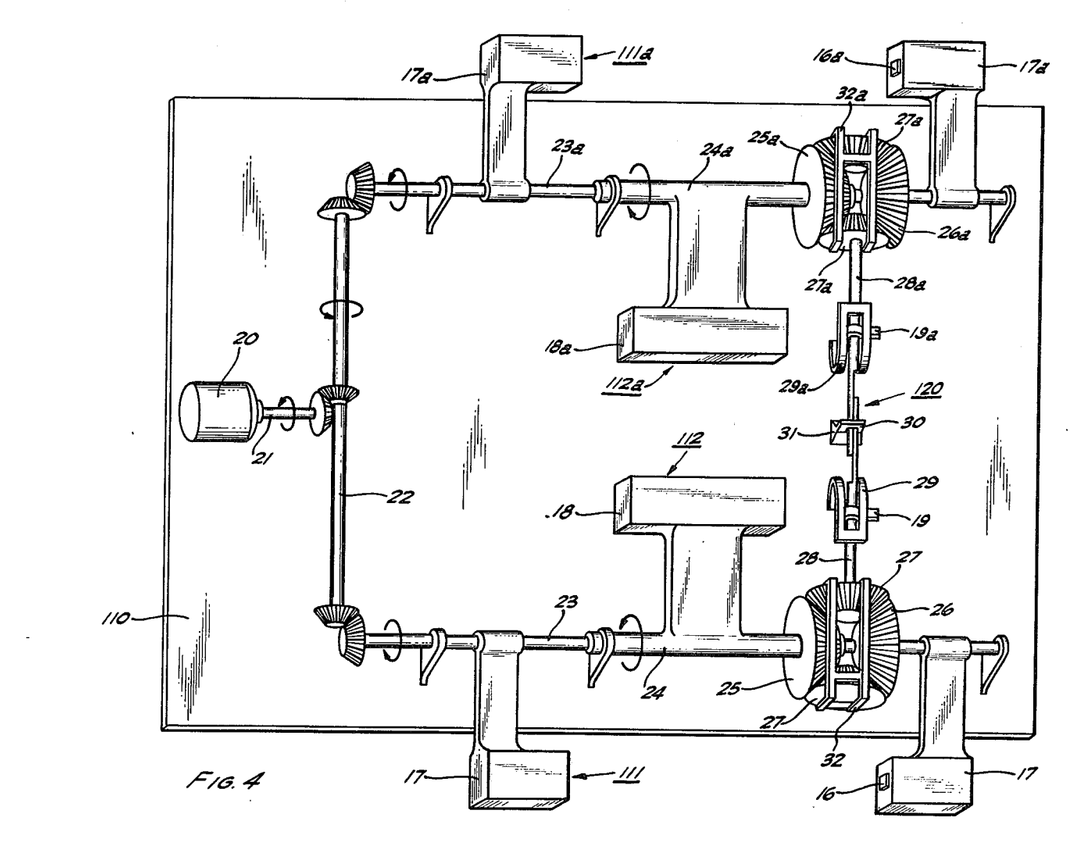
FIG. 4 is a top view of another embodiment of the counter-rotating eccentric weight seismic source of this invention.
Figure 5A:
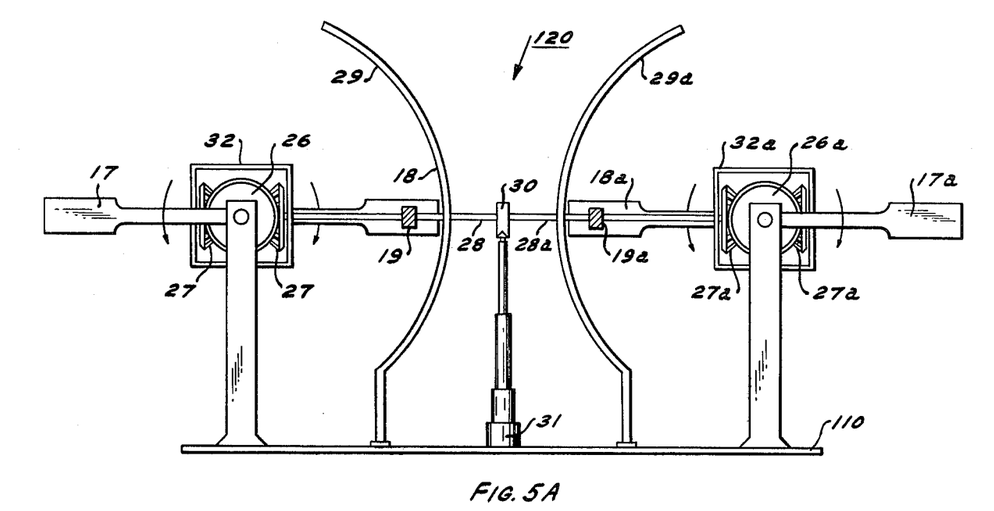
FIGS. 5A and 5B are end views of the seismic source illustrated in FIG. 4.
Figure 5B:
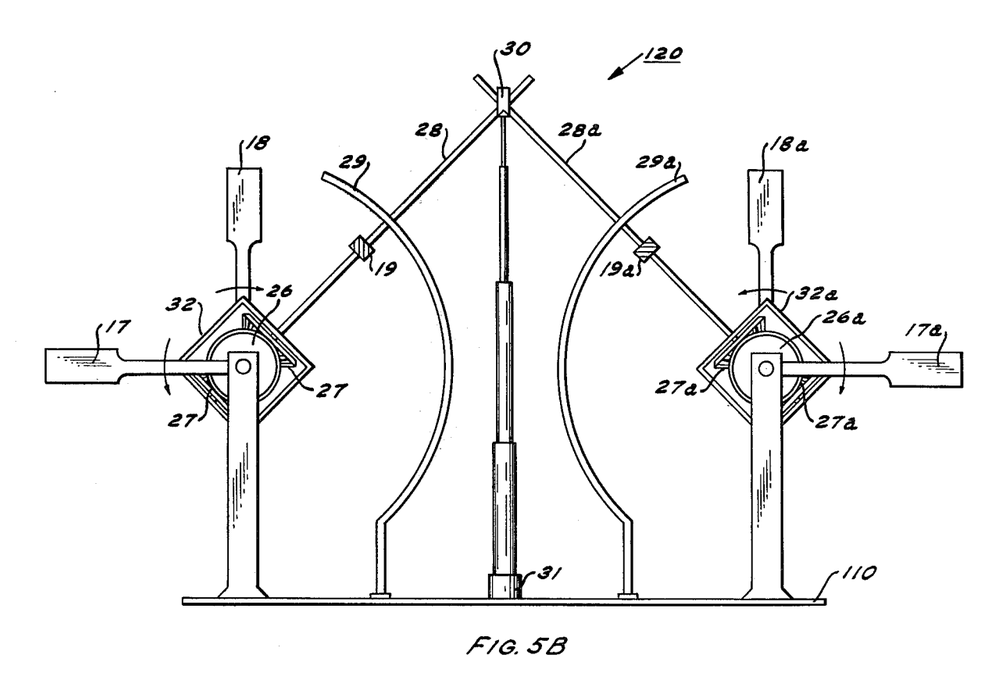

FIGS. 4, 5A and 5B illustrate still another embodiment of a rotating eccentric weight seismic source of this invention employing a mirror image pair of coaxial counter-rotating eccentric weight units. In this embodiment, there are four rotatable elements as follows: (1) rotatable element 111 includes eccentric weights 17, having centers of mass displaced from a first axis of rotation, and gear 26, both of which are fixedly attached to axle 23; (2) rotatable element 111a includes eccentric weights 17a, having centers of mass displaced from a second axis of rotation parallel to and displaced from the first axis of rotation, and gear 26a, both of which are fixedly attached to axle 23a which is parallel to and displaced from axle 23; (3) rotatable element 112 includes eccentric weight 18, having a center of mass displaced from said first axis of rotation, and gear 25, both of which are fixedly attached to axle 24 which is concentric with axle 23; and (4) rotatable element 112a includes eccentric weight 18a, having a center of mass displaced from said second axis of rotation, and gear 25a, both of which are fixedly attached to axle 24a which is concentric with axle 23a. Axles 23, 23a, 24 and 24a are rotatably mounted on base 110 by means of bearings, not shown, and are supported above and parallel to the lower surface of base 110. Rotatable elements 111 and 112 are counterrotatable about said first axis of rotation which is coincident with the center line of concentric axles 23 and 24, and rotatable elements 111a and 112 are counter-rotatable about said second axis of rotation which is coincident with the center line of concentric axles 23a and 24a, i.e., the first and second axes of rotation are parallel to and equidistant above the lower surface of base 110 and are displaced from each other.

Prime mover 20 is mounted on base 110 and drives axels 23 and 23a in opposite directions via shafts 21 and 22 and the appropriate gear means shown and through conversion gears 27 and 27a which are secured by frames 32 and 32a, respectively, drives axels 24 and 24a in opposite directions. Consequently, rotatable elements 111 and 112 are counter-rotated about a first axis of rotation, rotatable elements 111a and 112a are counter-rotated about a second axis of rotation, with rotatable elements 111 and 111a being rotated about their respective axes in opposite directions, as are elements 112 and 112a.

In the preferred embodiment illustrated, the eccentric moments of the four rotatable elements about their respective axes of rotation are equal; the rotatable elements all rotate at the same speed; and the angular positions of the centers of mass of elements 111a and 112a are at all times a mirror image of the angular positions of the centers of mass of elements 111 and 112 respectively. As for the force generated by balanced coaxial counter-rotating weight source of FIG. 3, the force generated by each of the balanced coaxial counter-rotating weight units of FIG. 4 acts only in one angular plane, which plane passes through the axis of rotation and is perpendicular to a line connecting the centers of mass of the counter-rotating eccentric weights when the weights are 180° apart. The angle of this plane about the axis of the rotation depends on the phase relationship or orientation of the counter-rotating weights.

Phase shifting means 120 is provided for adjusting the phase relationship of the counter-rotatable elements of each unit, thereby adjusting the angle of the plane of force generated by each unit and consequently altering the peak force magnitude. Phase shifting means 120 includes conversion gears 27 and 27a which are secured by frames 32 and 32a, respectively, and which are angularly adjustable about the first and second axes of rotation by rods 28 and 28a, respectively. Rods 28 and 28a are, respectively, perpendicular to the first and second axes of rotation, are restricted from lateral movement by guides 29 and 29a, and are slidably held at adjustable angular positions about their respective axes by rod holder 30. Jack 31 mounted on base 110 is provided to adjust the vertical position of rod holder 30 and consequently the angular positions of rods 28 and 28a and conversion gears 27 and 27a.

FIGS. 5A and 5B illustrate the operation of phase shifting means 120. Jack 31 adjusts the vertical position of rod holder 30 which results in a rotation of rod 28, frame 32 and conversion gears 27 counter-clockwise about the first axis of rotation and of rod 28a, frame 32a and conversion gears 27a clockwise about the second axis of rotation. A rotation of rods 28 and 28a through any angular displacement results in a shift in the position of weights 18 and 18a relative to weights 17 and 17a of twice the angular displacement. The rotation of weights 18 and 18a is always twice that of rods 28 and 28a due to (1) the angle of rotation of the rods and (2) the rotation of conversion gears 27 and 27a due to movement past stationary gears 26 and 26a.

FIG. 4 illustrates actuators 16 and 16a mounted on, respectively, weights 17 and 17a so as to rotate with, respectively, rotatable elements 111 and 111a. Actuators 16 and 16a are located at a point about their respective axes of rotation coinciding with radii that pass through the center of mass of, respectively, rotatable elements 111 and 111a. Pulse generators 19 and 19a are fixedly mounted on rods 28 and 28a, respectively, and are located in such positions that the respective actuator 16 or 16a passes it once during each revolution of respective rotatable element 111 or 111a at the point corresponding to the angular position of the respective actuator at which the peak earthward force for each revolution is developed. This angular position depends on the relative orientation of the rotatable elements about their respective axes of rotation. The angular positions of pulse generators 19 and 19a mounted on rods 28 and 28a respectively are automatically adjusted as the phase shifting means 120 changes the phase relationship and consequently the angular positions of the centers of mass of the rotatable elements which correspond to the angular positions at which the peak earthward force for each revolution is generated.

Referring to FIG. 5A, the centers of mass of the rotatable elements are all traveling perpendicular to and toward the lower surface of base 110; pulse generators 19 and 19a and actuators 16 and 16a (on the back side of weights 17 and 17a respectively) are 180° apart about their respective axes of rotation and in a plane therethrough. The angular positions of the rotatable elements at which the peak earthward force is developed is reached by rotating the eccentric weights 180° in the directions shown. In that position all the centers of mass will be traveling perpendicular to and away from the lower surface of base 110; and actuators 16 and 16a will be aligned with and in close proximity to pulse generators 19 and 19a respectively.

FIG. 5B illustrates the position attained when the rod holder 30 has been raised to correspond to a 45° angular adjustment of rods 28 and 28a about their respective axes of rotation. In this position, weights 18 and 18a are traveling parallel to the lower surface of base 110 and toward the center thereof; weights 17 and 17a are traveling perpendicular to and toward the lower surface of base 110; and actuators 16 and 16a (attached to weights 17 and 17a respectively) and pulse generators 19 and 19a (attached to rod holders 28 and 28a respectively) are 225° apart about their respective axes of rotation. From summation of the momentum vectors of the rotatable elements at all points in a revolution, it will be apparent that the angular positions of the rotatable elements of the apparatus of FIG. 5B, at which the peak earthward force is developed, are reached by a 225° rotation of those elements in the directions shown. In that position, the centers of mass of weight 18 and 17 will be 180° apart about the first axis of rotation and traveling away from the center of the lower surface of base 110 at an angle of 45° from that surface; the centers of mass of weights 18a and 17a will be 180° apart about the second axis of rotation and traveling away from the center of the lower surface of base 110 at an angle of 45° from that surface; and actuators 16 and 16a will be aligned with and in close proximity to pulse generators 19 and 19a, respectively. Various rearrangements and modifications in the locations of the actuators and the pulse generators are possible, however the instant of their passing in close proximity should correspond to the instant of peak earthward force. Additionally, although each of the eccentric weight units is shown with a sensor it is contemplated that only one sensor would be required. The second sensor can however be employed to determine whether the two units are in phase.

The magnitude of the peak force generated by the use of the rotatable element orientation of FIG. 5B is about 0.708 times that of the peak force generated by the use of the rotatable element orientation of FIG. 5A when the rotational speed is the same. FIg. 5A illustrates the orientation of rotatable elements at which the maximum peak force magnitude is generated for a given rotational speed. If the rotatable elements orientation is adjusted such that the counter rotating elements of each unit are 180° apart when they are traveling parallel to the lower surface of base 110 and toward the center thereof, there is no net force generated. Use of a mirror image pair of balanced coaxial counter rotating weight units allows the net force generated to be adjustable and assures that it acts only in a direction perpendicular to the plane connecting the axes of rotation.

In operation, prime mover 20 rotates rotatable elements 111 and 111a in opposing directions which through conversion gears 27 and 27a, respectively, causes rotatable elements 112 and 112a to rotate in opposing directions and in counter rotation to, respectively, rotatable elements 111 and 111a. When actuators 16 and 16a pass, respectively, pulse generators 19 and 19a pulses are generated, which pulses correspond to the instant of the peak earthward force of the source. It is preferred that all the rotatable elements rotate at the same speed. As the rotational speed is increased, the magnitude of the peak force generated will increase and as the rotational speed is decreased, the magnitude of the peak force generated will decrease, unless the phase shifting means 120 is adjusted as described previously.

The mirror-image pair source can generate a wide variety of coded energy signals. If the source is coupled to the earth, a sinusoidal energy signal will be generated. If the source is allowed to decouple, an energy signal comprising a train of a plurality of impulses will be generated. Either of these energy signals can be coded in any one of a wide variety of ways, including: (1) a time-varying frequency and a naturally varying peak force magnitude signal is generated by maintaining the rod holder 30 in a single position and either accelerating or decelerating the rotational speed of the weights; (2) a time-varying frequency and constant peak force magnitude signal is generated by adjusting the position of the rod holder 30 to maintain a constant peak force magnitude as the rotational speed of the weights is either accelerated or decelerated; and (3) a constant frequency and time varying peak force magnitude signal is generated by maintaining a constant rotational speed as the position of the rod holder 30 is varied to alter the peak force magnitude. Various other codes which can be generated by this mirror image pair source are contemplated and will become obvious to those skilled in the art from this description.

In a preferred method for employing the mirror image pair source of this invention to transmit a coded energy signal into the earth, the phase of the rotatable elements are maintained in a position such that no net force is generated by the source as the rotational speed is adjusted to a desired initial speed. After this speed is attained, the position of rod holder 30 is rapidly adjusted to an initial position which corresponds to a desired initial peak force magnitude. Thereafter the rotational speed is either accelerated or decelerated as desired and the position of rod holder 30 is adjusted to attain the desired peak force variation. Thereby, a coded energy signal of desired frequency and peak force magnitude code is transmitted into the earth. The coded energy signal is ended by rapidly adjusting the position of rod holder 30 such that zero net force is transmitted.

Figure 7:
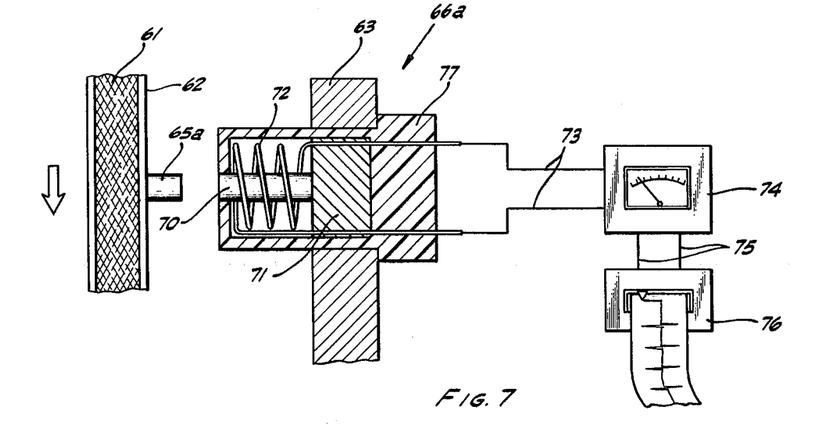
FIGS. 7, 8 and 9 are vertical cross-sections schematically illustrating three embodiments of the sensor useful in this invention.

FIG. 7 illustrates one embodiment of the magnetic sensor useful in this invention as positioned on the seismic source illustrated in FIG. 2. The magnetic actuator 65a is fixedly attached to pulley 62 which is driven by drive belt 61. Magnetic actuator 65a is a cylindrical metal protrusion, or preferably a magnet. Fixedly attached to base 63, is magnetic pulse generator having a cylindrical metal pole piece 70; a magnet 71; and a conductive wire coil 72 encased in a nonconductive housing 77. The coil 72 is electrically connected to an ammeter 74 via electrical conductor 73. The output of the ammeter is recorded by recorder 76, which is connected to ammeter 74 by electrical conductor 75. The passage of magnetic actuator 65a in close proximity to pulse generator 66a causes a flux in the magnetic field around pole piece 70 which thereby induces a current in coil 72. Unlike an accelerometer or geophone in which a pole piece moves within a coil, thereby inducing a current, the relative positions of pole piece 70 and coil 72 are fixed in magnetic pulse generator 66a. This fixed positioning renders the magnetic sensor relatively insensitive to vibrations, sounds and other interferences thus producing a code signal comprising a plurality of clear, pronounced electrical pulses with a substantially interference-free background.

Figure 8:
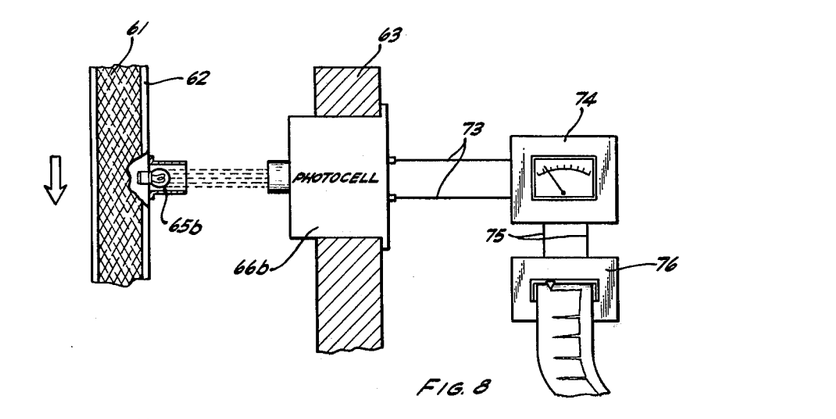

Similarly FIG. 8 illustrates an embodiment of the optical sensor useful in this invention wherein a light source actuator 65b, which is fixedly attached to pulley 62, actuates the photo cell pulse generator 66b, thereby causing an electrical pulse to be emitted. Ammeter 74, recorder 76 and electrical conductors 73 and 75 are the same as in FIG. 7.

Figure 9:
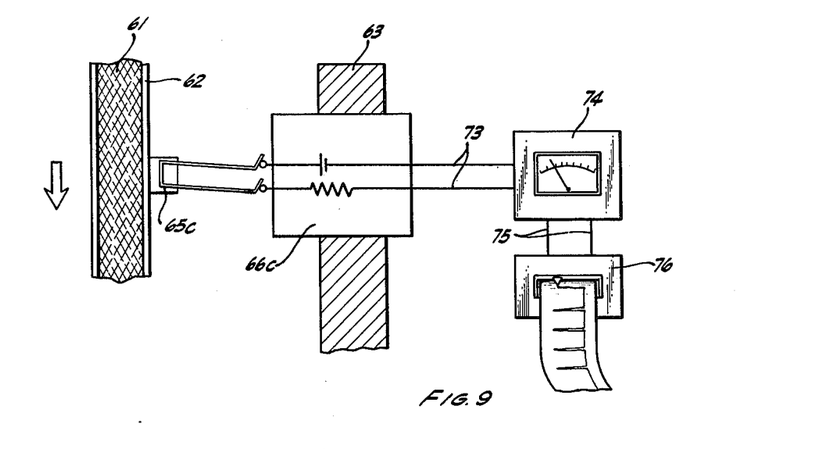

One embodiment of an electrical sensor is illustrated in FIG. 9, wherein metal contact actuator 65c, which is fixedly attached to pulley 62, completes the otherwise open circuit of electrical pulse generator 66c, causing a pulse of current to flow through electrical conductors 73. Ammeter 74, recorder 76 and lines 73 and 75 are the same as in FIG. 7.

All of these sensors have the feature of being relatively insensitive to undesirable stimuli, such as noise, vibration and other interferences and being sensitive to desirable stimuli, i.e., the passing of the actuator. The ammeter 74 and recorder 76 are illustrated only to demonstrate one method of recording the code signal emitted by the source. In the method of this invention it is preferred that the code signal be transmitted, either by electrical conductors or by radio signal, to the recording means.

The novel seismic sources of this invention have a peak earthward force to total weight ratio greater than about 2. Preferably this ratio is greater than about 5 and more preferably greater than about 10. In contrast, the conventional VIBROSEIS ® type sources which are coupled to the earth require a force to weight ratio of less than 1 in order to avoid decoupling. Since the sources employed in the method of this invention are preferably decoupling sources, the force to weight ratio is only limited by practical mechanical limitations. With the use of strong, light weight materials such as aluminum or titanium for the non-rotating parts of the source, very high ratios of force to weight are attainable. Accordingly, the weight required for a given impact force is greatly reduced, making the sources of this invention most suitable for exploration of relatively inaccessible regions. Force to weight ratios of 50 and even greater may be practical.

These rotating eccentric weight decoupling sources are employed in the exploration method of this invention to generate and transmit into the earth, a coded impulse train. Various impluse train exploration methods are known in the art, such as those disclosed in U.S. Pats. Nos. 3,517,380 to Barbier et al., 3,662,970 to Sayous et al. and 3,326,320 to Forester. U.S. Pat. No. 3,698,009 to Barbier discloses an impulse train exploration method in which a train of substantially constant amplitude impulses is transmitted into the earth and the energy returned from within the earth is automatically shift-summed as it is recorded. These prior art methods however used slave-type sources which transmit the impulses according to a predetermined and usually precisely controlled code. Prior art attempts to use master-type sources, or slave-type sources for which the source signature used to correlate the raw seismic data was not predetermined, have had very little success due to the difficulty experienced in precisely determining the time breaks of the impulses. The novel sources of this invention are not so limited.

Figure 1:
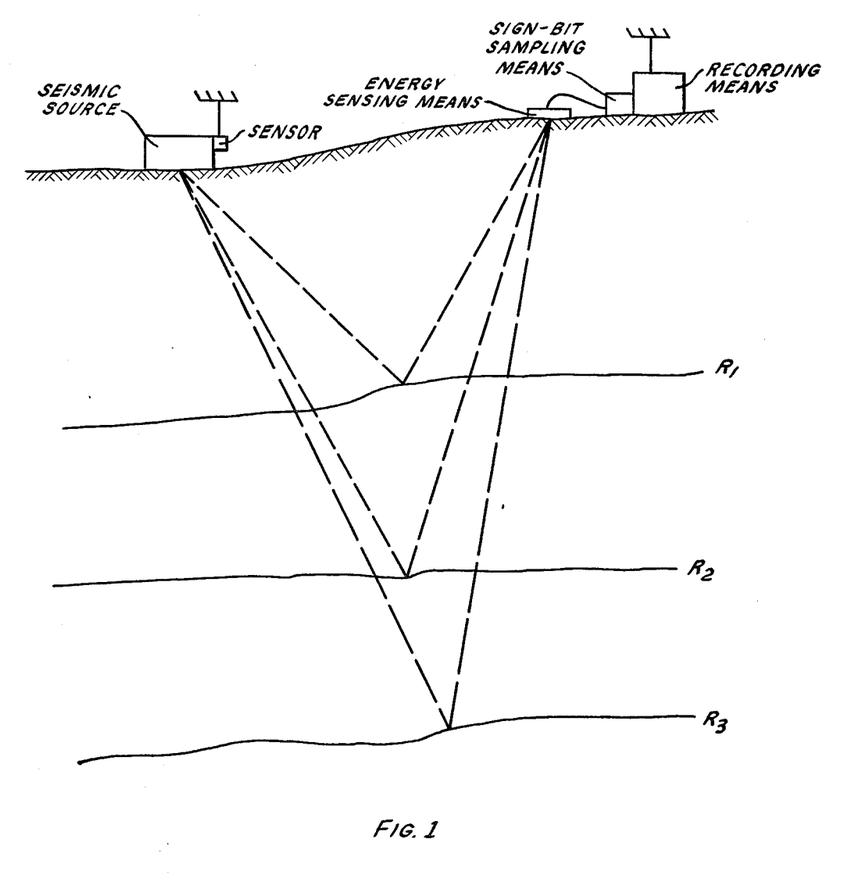
FIG. 1 is a schematic diagram of a cross-section of earth strata illustrating one embodiment of the exploration method of this invention.

FIG. 1 illustrates one application of the seismic exploration method of this invention to earth strata underlying a horizontal surface. A decoupling seismic source of this invention transmits a coded energy signal into the earth; the seismic energy reflected from subsurface reflectors $R_1$, $R_2$ and $R_3$ is sensed with an energy sensing means, such as a geophone, which generates a returned energy signal proportional to the sensed seismic energy; a sign-bit sampling means periodically samples the polarity of the returned energy signal, thereby forming a plurality of sign-bit samples; the sign-bit samples are automatically shift-summed in response to a code signal generated by the sensor which contains the time breaks of the source impulses; the shift-summed samples thus obtained are recorded by the recording means. By this method, a shift-summed sign-bit-only trace is obtained in real time.

Although only the reflected seismic waves are illustrated in FIG. 1 it should be understood that the method of this invention can also be successfully employed in other types of seismic exploration, such as refractive seismic exploration.

Other than the novel seismic sources of this invention, the equipment employed is well known in the art. The energy sensing means employed onshore are geophones. The recording means preferably is a minicomputer which includes means for periodically sampling the polarity of the signal generated by the geophones and means for effecting shift-summing of the sign-bit samples as well as means for recording the shift-summed samples. Conventionally one recording means handles data from a plurality of geophone groups, such as 12 or more.

The method of this invention can be employed in any onshore location, it is however particularly useful in exploration of relatively inaccessible regions wherein the prior art methods employing slave-type sources are precluded due to the weight of the required equipment. The various steps and preferred equipment of the method of this invention combine to significantly reduce the weight of the equipment required.

The weight of the seismic source required is reduced, as compared to the prior art systems, because: (1) the use of a mastertype decoupling source eliminates the need for heavy source control equipment and hold-down weight; (2) by the recording of only the sign-bit of the sensed energy, the magnitude of the transmitted force is less important than the number of impulses transmitted; and (3) while prior art multiple impulse methods, in which the sensed energy was automatically shift-summed as it is recorded, require seismic sources which transmit substantially identical impulses, the recording of only the sign-bit in the method of this invention makes it possible to employ even variable-force seismic sources which are generally less sophisticated and lighter weight.

The weight of the required sampling and recording equipment for use in the method of this invention is less than that of the high quality prior art equipment, because: (1) fewer memory positions are required since the seismic data is automatically shift-summed; and (2) since only the sign-bit is sampled, shift-summed and recorded, a less sophisticated sampling means, smaller capacity memory positions and less sophisticated computational capacity are required.

Furthermore, these weight reductions are not achieved at the expense of seismic data quality. Due to the precise record of the source impulse time breaks which is emitted by the sensor of this invention, the sign-bit samples are more accurately shift-summed, consequently the shift-summed trace obtained is superior in quality to a trace obtained by shift-summing the sign-bit samples according to the source signature emitted by the prior art sensors. The amplitude of the trace samples is effectively rebuilt by the shift-summing of the sign bit as the randomnly oriented background noise is effectively cancelled and the energy due to seismic events adds in phase.

In the method of this invention, the frequency of the impulses can vary between about 0.5 and about 150 impulses per second and more preferably between about 5 and about 75 impulses per second. The minimum time interval between successive impulses should be at least about 10 milliseconds and preferably at least about 15 milliseconds in order to avoid overlap and therefore distortion of the input signal. The number of impulses in a single coded signal can vary from about 10 to about 400 or more. Preferably the coded energy signal consists of a ramp of either steadily increasing or alternatively steadily decreasing frequency, although other codes may be successfully employed. The coded energy signals vary between about 1 and about 20 seconds in length. The preferred coded energy signals are those whose autocorrelation function [cf. Sheriff, R. E., Encyclopedia Dictionary of Exploration Geophysics, The Society of Exploration Geophysicists (1973)] has a largest absolute central-maximum to next-largest absolute maximum ratio of at least about 3. This ratio is preferably at least about 10 and more preferably at least about 20.

In a preferred embodiment of the method of this invention, multiple coverage of a section of earth strata is obtained by separately transmitting a plurality of differently coded energy signals into the earth from a single source point. The sensor will generate a corresponding plurality of code signals, a plurality of returned energy signals will be generated by the energy sensing means, and the sign-bit samples obtained will be automatically shift-summed in response to the corresponding code signal. The shift-summed samples are then added to the previously recorded shift-summed samples for the same energy sensing means location. A vertically stacked shift-summed trace is thereby automatically obtained, eliminating the need to separately record each of the shift-summed traces, before vertically stacking them. The use of differently coded energy signals produces smaller correlation residuals than repeated use of a single code.

The shift-summed or vertically stacked shift-summed traces can be further processed by conventional seismic data processing methods which are well known in the art. Such methods include: common depth point stacking, moveout corrections, frequency filtering, and correlation residual reduction processing, such as dynamic predictive deconvolution or predictive subtraction deconvolution.

This invention is further illustrated by the following example which is illustrative of one specific mode of practicing the invention and is not intended as limiting the scope of the invention as defined by the appended claims.

EXAMPLE

Figure 6A:
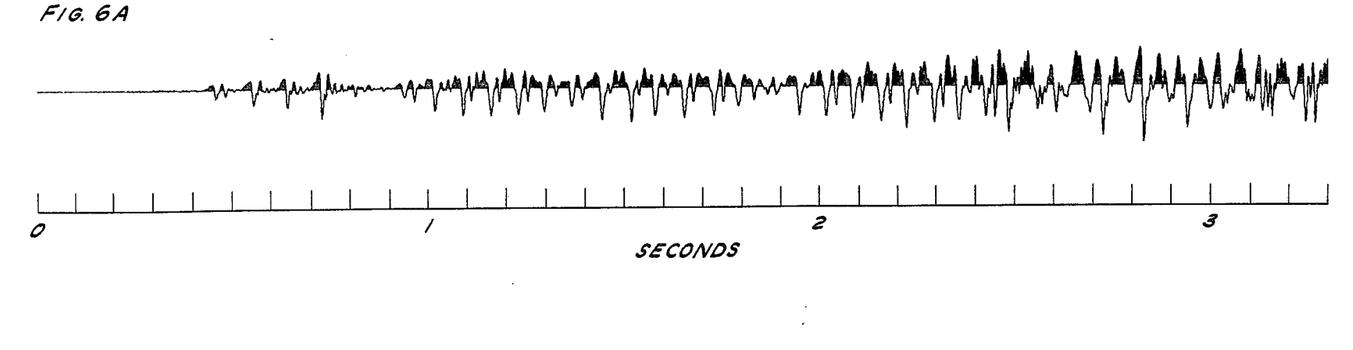
FIGS. 6A through 6D are graphical representations comparing the source signatures emitted by the prior art seismic source sensors with the source signature emitted by the sensor of this invention.
Figure 6B:
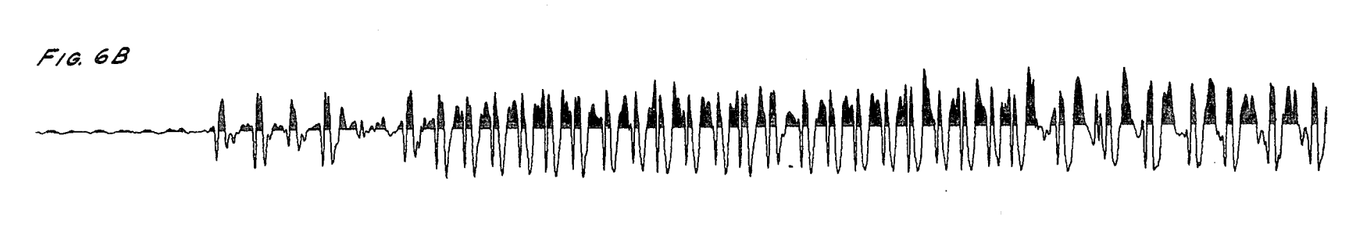
Figure 6C:
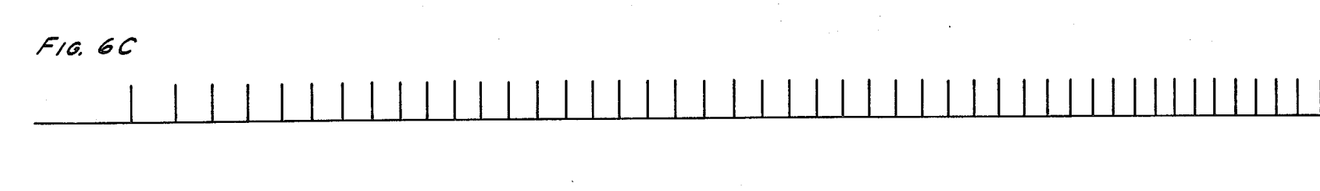
Figure 6D:
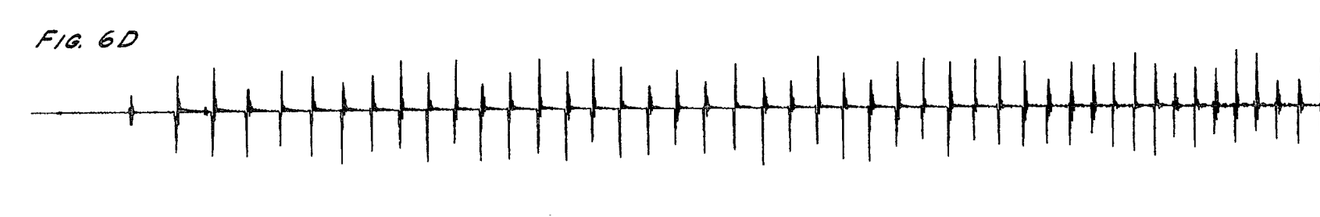

A rotating eccentric weight source of the type illustrated in FIG. 2, manufactured by installing an Electro TM 3010AN magnetic sensor on a Wacker TM VPG 600 vibro plate compactor, is employed to transmit a coded train of impulses into the earth. Several different sensor means are employed to sense the time breaks of each of the impulses. According to the various source code sensing methods taught in the prior art, an accelerometer is attached to the base of the source and a geophone is coupled to the ground a short distance away from the source. Records of the output from each of the sensor means of the prior art and of a magnetic sensor of this invention were made. These records are graphically illustrated in FIGS. 6A through 6D. FIG. 6A is the output of the accelerometer, FIG. 6B is the output of the geophone, FIG. 6D is the output of the magnetic sensor of this invention, and FIG. 6C is a representation of the actual time breaks.

It is obvious that the source code record obtained by recording the output of the sensor of this invention is much superior to the source code records produced by recording the output of the prior art sensor means. Therefore the correlated seismic traces, obtained by shift-summing the raw seismic data in response to the code signal generated by the sources of this invention, will be of superior quality to the correlated seismic traces obtained with use of the prior art sensor means.

While particular embodiments of the invention have been described, it will be understood, of course, that the invention is not limited thereto since many obvious modifications can be made, and it is intended to include within this invention any such modifications as will fall within the scope of the claims.

Having now described the invention, I claim:

1. A seismic source apparatus comprising:

a first rotatable element having a center of mass displaced from and rotatable about a first axis of rotation;

support means for rotatably supporting said first rotatable element;

drive means for rotating said first rotatable element about said first axis of rotation; and position sensor means for directly detecting the instants that the center of mass of said first rotatable element passes that angular position about said first axis of rotation at which said apparatus develops the peak earthward force during each revolution of said first rotatable element, said position sensor means including two components (1) an actuator and (2) a pulse generator which generates a discrete electrical pulse each time said actuator passes in close proximity to said pulse generator, one of said components being fixedly mounted on said first rotatable element so as to rotate about said first axis of rotation with said first rotatable element, and the other of said components being fixedly mounted on said support means at a preselected position about said first axis of rotation, said preselected position being selected such that the rotating component passes in close proximity to the stationary component at and only at the instant at which the center of mass of said first rotatable element passes said angular position.

2. The apparatus defined in claim 1 wherein said actuator is fixedly mounted on said first rotatable element, and said pulse generator is fixedly mounted at said preselected position on said support means, said pulse generator being responsive to said actuator and substantially insensitive to vibrations, sounds and other background interferences.

3. The apparatus defined in claim 1 including a second rotatable element having a center of mass displaced from and rotatable about said first axis of rotation; and wherein said support means includes means for rotatably supporting said second rotatable element and said drive means includes means for rotating said second rotatable element about said first axis of rotation in counter-rotation to said first rotatable element.

4. The apparatus defined in claim 3 including third and fourth rotatable elements having centers of mass displaced from and rotatable about a second axis of rotation parallel to and displaced from said first axis of rotation; and wherein said support means includes means for rotatably supporting said third and fourth rotatable elements, and said drive means includes means for counter-rotating said third and fourth rotatable elements about said second axis of rotation.

5. A seismic source apparatus comprising:
a rotatable element having a center of mass displaced from and rotatable about an axis of rotation;
support means for rotatably supporting said rotatable element;
drive means for rotating said rotatable element about said axis of rotation;
an actuator fixedly mounted on said rotatable element so as to rotate about said axis of rotation with said rotatable element; and
a pulse generator fixedly mounted on said support means at a preselected stationary position about said axis of rotation, said stationary position being selected such that said actuator will pass in close proximity to said pulse generator at and only at the instant at which said apparatus develops the peak earthward force during each revolution of said rotatable element, said pulse generator including means for generating a discrete electrical pulse each time said actuator passes in close proximity to said pulse generator.

6. The apparatus defined in claim 5 wherein said actuator is a magnet and said pulse generator generates a discrete electrical pulse in response to the magnetic flux caused by the passage of said actuator in close proximity to said pulse generator.

7. A seismic source apparatus comprising:
first and second rotatable elements having centers of mass displaced from and rotatable about a first axis of rotation;
support means for rotatably supporting said first and second rotatable elements;
drive means for counter-rotating said first and second rotatable elements about said first axis of rotation at the same speed;
an actuator fixedly mounted on said first rotatable element so as to rotate about said first axis of rotation with said first rotatable element;
a pulse generator fixedly mounted on said support means at a preselected position about said first axis of rotation, said preselected position being selected such that said actuator will pass in close proximity to said pulse generator at and only at the instant at which said apparatus develops the peak earthward force during each revolution of said first rotatable element, said pulse generator including means for generating a discrete electrical pulse each time said actuator passes in close proximity to said pulse generator.

8. The apparatus defined in claim 7 wherein the eccentric moments of said first and second rotatable elements about said first axis of rotation are equal.

9. The apparatus defined in claim 7 including third and fourth rotatable elements having centers of mass displaced from and rotatable about a second axis of rotation parallel to and displaced from said first axis of rotation; and wherein said support means includes means for rotatably supporting said third and fourth rotatable elements, and said drive means includes means for counter-rotating said third and fourth rotatable elements about said second axis of rotation at the same speed as said first and second rotatable elements.

10. The apparatus defined in claim 9 wherein the eccentric moments of said first, second, third and fourth rotatable elements about their respective axes of rotation are equal.

11. A seismic source apparatus comprising:
first and second rotatable elements having centers of mass displaced from and rotatable about a first axis of rotation;
third and fourth rotatable elements having centers of mass displaced from and rotatable about a second axis of rotation parallel to and displaced from said first axis of rotation;
support means for rotatably supporting said first and second rotatable elements and said third and fourth rotatable elements;
drive means for counter-rotating said first and second rotatable elements about said first axis of rotation, and for counter-rotating said third and fourth rotatable elements about said second axis of rotation at the same speed;
phase shifting means for shifting the phase relationship between said first rotatable element and said second rotatable element, and between said third rotatable element and said fourth rotatable element; and
position sensor means for directly detecting the instants that the center of mass of said first rotatable element passes that angular position about said first axis of rotation at which said apparatus develops the peak earthward force during each revolution of said rotatable elements, said position sensor means including two components (1) an actuator and (2) a pulse generator which generates an electrical pulse each time said actuator passes in close proximity to said pulse generator, one of said components being fixedly mounted on said first rotatable element so as to rotate about said first axis of rotation with said first rotatable element, and the other of said components being mounted on said support means at a preselected position about said first axis of rotation, said preselected position being selected such that the rotating component passes in close proximity to the stationary component at and only at the instant at which the center of mass of said first rotatable element passes said angular position.

12. The apparatus defined in claim 11 wherein the eccentric moments of said rotatable elements about their respective axes of rotation are equal and the angular positions of the centers of mass of said first and second rotatable elements about said first axis of rotation are a mirror image of the angular positions of the centers of mass of said third and fourth rotatable elements respectively at all positions of said centers of mass about their respective axes of rotation.

13. The apparatus defined in claim 11 wherein said actuator is fixedly mounted on said first rotatable element so as to be rotatable with said first rotatable element about its axis of rotation, and wherein said pulse generator is mounted on said support means at said preselected position so as to be adjustable about said first axis of rotation.

14. The apparatus as defined in claim 13 wherein said pulse generator is mounted on said phase shifting means.

15. The apparatus defined in claim 6 wherein said pulse generator comprises (a) a cylindrical metal pole piece fixedly mounted on said support means so that one end of the pole piece becomes axially aligned and in close proximity with said actuator once during each revolution of said actuator about said axis of rotation; (b) a permanent magnet fixedly positioned at the other end of said pole piece; and (c) a conductive metal wire fixedly coiled about said pole piece to form an electrical circuit in which a discrete electrical pulse is induced by passage of said actuator in close proximity to said pulse generator, said metal wire being stationary with respect to the pole piece and the permanent magnet thereby rendering said pulse generator substantially insensitive to vibrations, sounds and other background interferences.

16. The apparatus defined in claim 5 wherein said support means includes a base plate parallel to and spaced from said axis of rotation; wherein said actuator is fixedly mounted on said rotatable element at a point about said axis of rotation coinciding with a radius that passes through the center of mass of said rotatable element; and wherein the pulse generator is fixedly mounted on said support means in the position at which said actuator will pass in close proximity to said pulse generator as said actuator is traveling perpendicular to and away from said base plate.

17. The apparatus defined in claim 5 wherein said actuator includes means for directing a beam of light at said pulse generator each time said actuator passes in close proximity to said pulse generator, and wherein said pulse generator is a photocell which emits a discrete electrical pulse in response to said beam of light.

18. The apparatus defined in claim 7 wherein said actuator is a magnet and said pulse generator generates a discrete electrical pulse in response to the magnetic flux caused by passage of said actuator in close proximity to said pulse generator.

19. The apparatus defined in claim 18 wherein said pulse generator comprises (a) a cylindrical metal pole piece fixedly mounted on said support means so that one end of the pole piece becomes axially aligned and in close proximity with said actuator once during each revolution of said actuator about said axis of rotation; (b) a permanent magnet fixedly positioned at the other end of said pole piece; and (c) a conductive metal wire fixedly coiled about said pole piece to form an electrical circuit in which a discrete electrical pulse is induced by passage of said actuator in close proximity to said pulse generator, said metal wire being stationary with respect to the pole piece and the permanent magnet thereby rendering said pulse generator substantially insensitive to vibrations, sounds and other background interferences.

20. The apparatus defined in claim 7 wherein said actuator includes means for directing a beam of light at said pulse generator each time said actuator passes in close proximity to said pulse generator, and wherein said pulse generator is a photocell which emits a discrete electrical pulse in response to said beam of light.

21. The apparatus defined in claim 13 wherein said phase shifting means includes means for automatically adjusting the position of said pulse generator about said first axis of rotation such that, upon adjustment of the phase relationships between said rotatable elements, the instant at which said actuator passes in close proximity to said pulse generator always corresponds to the instant at which said apparatus develops the peak earthward force during each revolution of said rotatable elements.

22. The apparatus defined in claim 11 wherein said actuator is a magnet and said pulse generator generates a discrete electrical pulse in response to the magnetic flux caused by passage of said actuator in close proximity to said pulse generator.

23. The apparatus defined in claim 22 wherein said pulse generator comprises (a) a cylindrical metal pole piece fixedly mounted on said support means so that one end of the pole piece becomes axially aligned and in close proximity with said actuator once during each revolution of said actuator about said axis of rotation; (b) a permanent magnet fixedly positioned at the other end of said pole piece; and (c) a conductive metal wire fixedly coiled about said pole piece to form an electrical circuit in which a discrete electrical pulse is induced by passage of said actuator in close proximity to said pulse generator, said metal wire being stationary with respect to the pole piece and the permanent magnet thereby rendering said pulse generator substantially insensitive to vibrations, sounds and other background interferences.

24. The apparatus defined in claim 11 wherein said actuator includes means for directing a beam of light at said pulse generator each time said actuator passes in close proximity to said pulse generator, and wherein said pulse generator is a photocell which emits a discrete electrical pulse in response to said beam of light.

* * * * *

UNITED STATES PATENT AND TRADEMARK OFFICE
CERTIFICATE OF CORRECTION

PATENT NO. : 4,143,737
DATED : March 13, 1979
INVENTOR(S) : OTIS G. ERICH, JR.

It is certified that error appears in the above-identified patent and that said Letters Patent are hereby corrected as shown below:

In column 17, line 32 (claim 14),

"13" should read --21--.

Signed and Sealed this

Seventeenth Day of July 1979

[SEAL]

Attest:

LUTRELLE F. PARKER
*Attesting Officer    Acting Commissioner of Patents and Trademarks*